United States Patent
Dougherty et al.

[11] Patent Number: 6,051,336
[45] Date of Patent: Apr. 18, 2000

[54] BATTERY CASE FOR THIN METAL FILM CELLS

[75] Inventors: Thomas J. Dougherty, Waukesha; Michael G. Andrew, Menomonee Falls; Gerald K. Bowen, Cedarburg; Jeffrey P. Zagrodnik, Hales Corners, all of Wis.

[73] Assignee: Johnson Controls Technology, Plymouth, Mich.

[21] Appl. No.: 09/008,719

[22] Filed: Jan. 19, 1998

[51] Int. Cl.⁷ ....................................................... H01M 2/02
[52] U.S. Cl. ........................... 429/149; 429/164; 429/176; 429/178
[58] Field of Search .................................... 429/149, 148, 429/163, 153, 175, 176, 94, 178, 164, 168, 151, 154

[56] References Cited

U.S. PATENT DOCUMENTS

| | | |
|---|---|---|
| 3,494,800 | 2/1970 | Shoeld . |
| 5,045,086 | 9/1991 | Juergens ................................. 29/623.1 |
| 5,047,300 | 9/1991 | Juergens ..................................... 429/94 |
| 5,198,313 | 3/1993 | Juergens ..................................... 429/94 |
| 5,368,961 | 11/1994 | Juergens ................................... 429/233 |
| 5,895,728 | 4/1999 | Walker et al. ............................. 429/53 |

FOREIGN PATENT DOCUMENTS

WO/98/32182  7/1998  WIPO .............................. H01M 2/10

*Primary Examiner*—Maria Nuzzolillo
*Assistant Examiner*—Monique M. Wills
*Attorney, Agent, or Firm*—Quarles & Brady LLP

[57] ABSTRACT

The present invention includes a battery case and battery wherein the battery case includes a housing having a top and a bottom and wherein the housing defines a plurality of cavities that are generally octagonal in cross-section. The battery includes a housing defining octagonal shaped cavities, a terminal coupled to the housing, a top and bottom sealingly coupled to the housing, and a plurality of battery cells disposed win the cavities and electrically interconnected in series with the terminal.

23 Claims, 4 Drawing Sheets

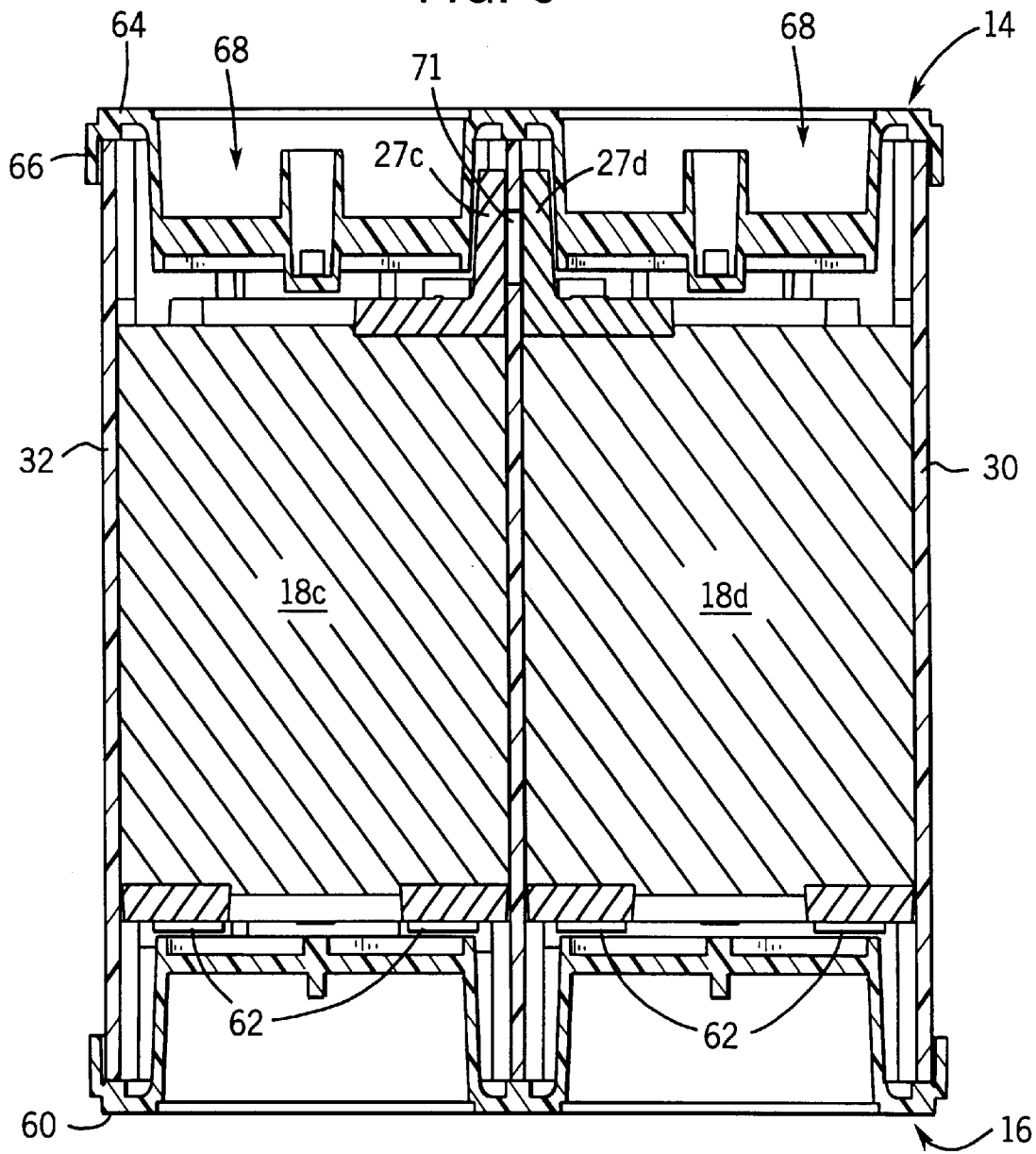

BATTERY CASE FOR THIN METAL FILM CELLS

BACKGROUND OF THE INVENTION

1. Technical Field

The present invention relates to electric storage batteries, and more particularly, to a container for thin metal film battery cells.

2. Discussion

Thin metal film (TMF) battery technology provides a compact high power battery cell. Cells of this type are well known and their construction and manufacture have been described in, for example, U.S. Pat. Nos. 3,494,800; 5,045,086; 5,047,300; 5,198,313 and 5,368,961 the disclosures of which are hereby incorporated by reference. A thin metal film battery cell includes thin metal film plates sealed within a sealed cell container which is valve regulated. The cells include absorptive glass-mat (AGM) separator technology in an electrolyte starved system. The thin metal film plates are made from very thin lead foil approximately about 0.005 inches thick, pasted with an active material forming a pasted plate approximately about 0.012 inches thick. The plates are spiral wound with separator material, and terminations are cast-on or soldered to the ends of the spiral roll. The roll is encapsulated in a container which is filled with electrolyte and then sealed except for the vent. The performance characteristics of thin metal film cells include a high power/weight ratio and rapid recharge capability.

In the present state of the art, TMF cells are individually packaged and sealed in plastic containers. These cells are then electrically joined in series to make the TMF battery. While the individual packaging of TMF cells is acceptable for single celled batteries or multiple celled batteries used in environments where the structural integrity of the cells is not of great concern, it is desirable to provide greater structural integrity for serially connected TMF cells. The prior art has failed to adequately address this need.

SUMMARY OF THE INVENTION

Accordingly, the present invention is directed to a battery case for thin metal film battery cells. The case includes a modified honeycomb design that defines a plurality of generally octagonal shaped cell cavities. The modified honeycomb design provides a container with a structural strength that is improved over prior art containers for multiple TMF cells. The modified honeycomb design also allows for uniform cell wall thickness throughout the case thereby increasing the uniform expansion or shrinkage during operation of the battery and reducing distortion following the molding process. Additionally, the case configuration provides a flat surface within each cavity to facilitate alignment of the cells within the cavity and the electrical interconnection of the cells. The modified honeycomb also improves the moldability of the case by eliminating knife edges within the mold core.

BRIEF DESCRIPTION OF THE DRAWINGS

The objects and features of this invention will become apparent from a reading of the following detailed description taken in conjunction with the drawings in which:

FIG. 3 is a bottom plan view fo the battery case illustrated in FIG. 1 with the bottom of the case removed for clarity;

FIG. 5 is a cross-sectional view of the battery taken along the plane 5—5—5 shown in FIG. 1;

DETAILED DESCRIPTION OF THE PREFERRED EMBODIMENTS

Figure 1:
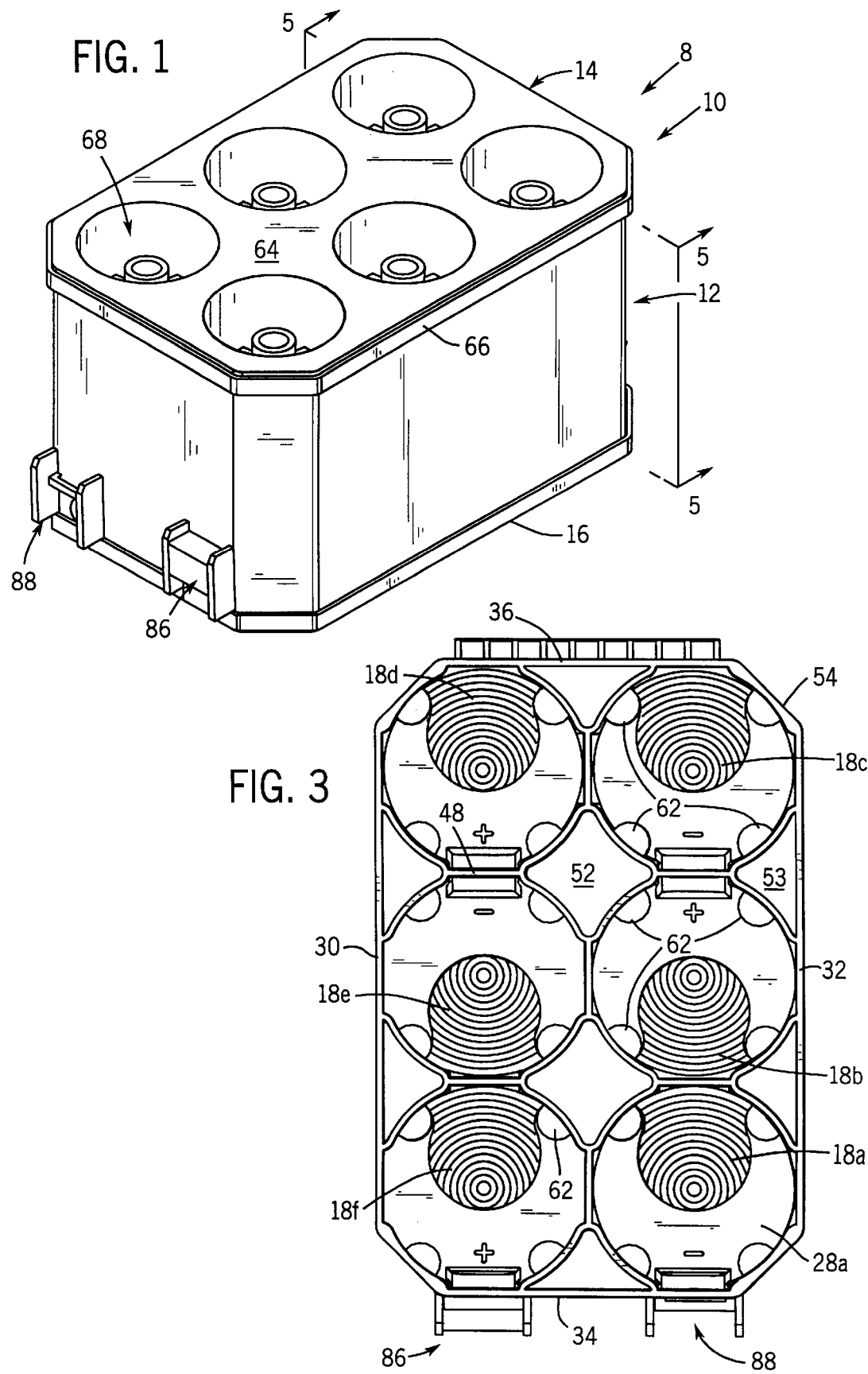
FIG. 1 is a perspective view of the thin metal film cell battery according to the present invention.

As illustrated in FIG. 1 the battery 8 includes a case 10 having a body 12 with a top 14 and a bottom 16 each coupled to the body in a manner known in the art such as by heat sealing. Case 10 is configured to accommodate a plurality of thin metal film cells 18 (FIG. 2) that include a thin metal film 20 coiled in a manner generally known in the art. The 1: film 20 defines an outer cylindrical surface area generally indicated by reference numeral 21, a first end 22, and second end 24. First and second conducting leads 26 and 28 are coupled to the respective first and second ends 22 and 24 of the coiled thin metal film 20 such as by welding or an equivalent technique known in the art. As thin metal film (TMF) battery cells are generally known in the art, recognized techniques for manufacturing TMF cells and the manner in which they generate electricity will not be described herein. For a general description of such cells, reference may be had to U.S. patent application Ser. No. 08/870,803, filed Jun. 6, 1997, entitled "Modular Electric Storage Battery", and assigned to the assignee of the present invention, the disclosure of which is incorporated herein by reference.

Figure 2:
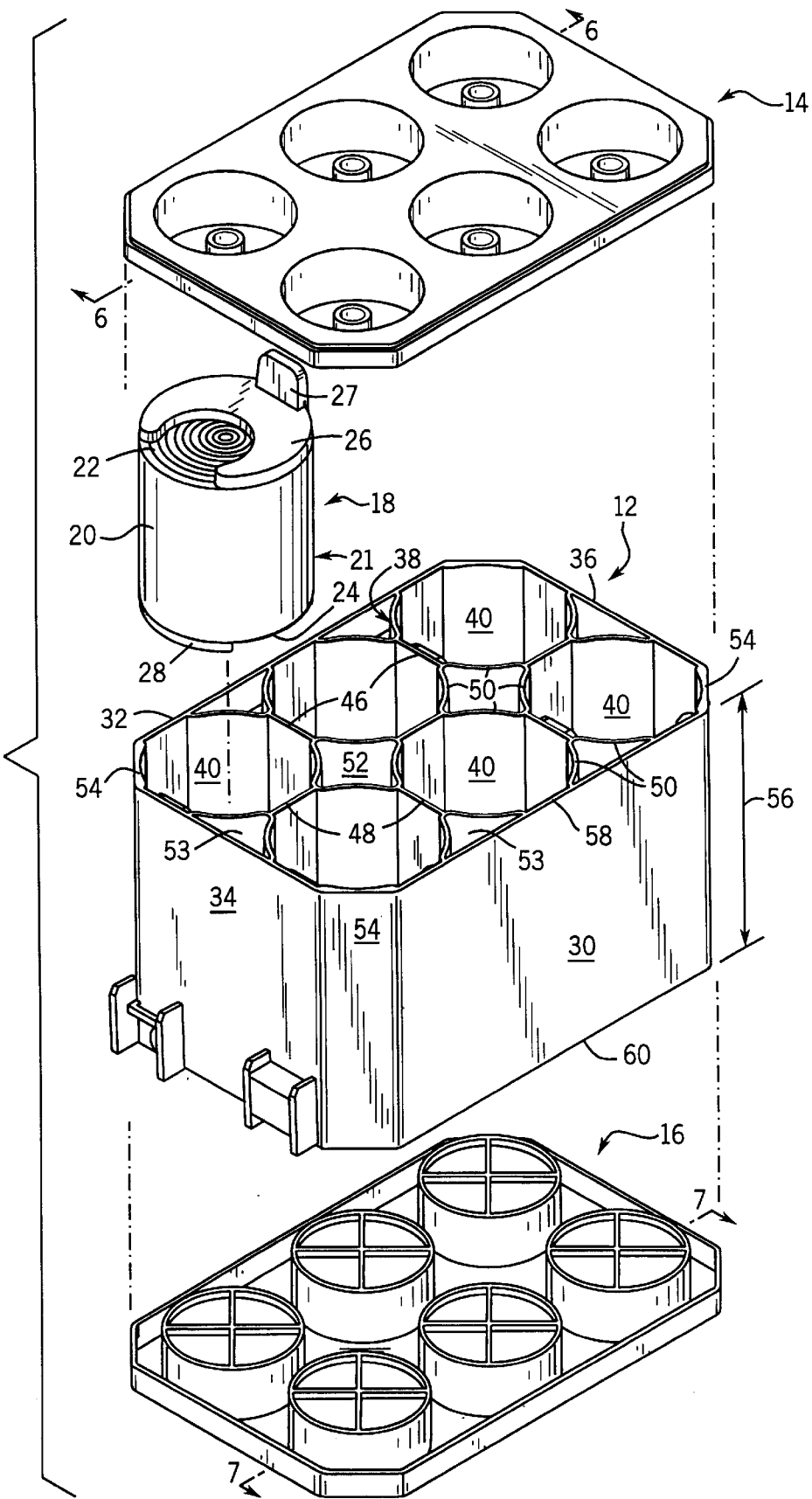
FIG. 2 is an exploded perspective view of the thin metal film cell battery illustrated in FIG. 1.

With reference to FIGS. 2 and 3, body 12 includes exterior side walls 30 and 32 and exterior end walls 34 and 36 as well as a plurality of partition walls generally indicated by reference numeral 38. Partition walls 38 interconnect exterior side walls 30 and 32 and exterior end walls 34 and 36 in a modified honeycomb configuration that includes a plurality of generally octagonal shaped cell cavities 40. This honeycomb configuration provides a structurally robust battery case capable of withstanding the internal pressures generated during operation, generally on the order of about twenty pounds per square inch gage (20 psig), without distortion.

In the illustrated embodiment, exterior walls 30, 32, 34, and 36, as well as each of the plurality of partition walls 38, have the same wall thickness 41 (FIG. 3) thereby simplifying the manufacture of case 10. Additionally, the modified honeycomb configuration and the uniform wall thicknesses of the various external and partition walls increases the uniformity of expansion or shrinkage during operation of the battery and reduces distortion following the molding process. Accordingly, case 10 more consistently maintains structural integrity throughout its operational life. Moreover, the honeycomb configuration includes a flat surface within each cavity to facilitate alignment of the cells within the cavity and the electrical interconnection of the cells such as by welding. A still further advantage of the present invention is that the honeycomb configuration improves the moldability of the case by eliminating knife edges within the mold core.

The modified honeycomb configuration will now be described in detail. Partition walls 38 include a plurality of first planar segments 46 and second planar segments 48 oriented orthogonal to first planar segments 46. Second planar segments 48 are further orthogonal to first and second exterior end walls 36 and parallel to first and second exterior side walls 30 and 32. In a similar manner, each of first planar segments 46 are parallel to first and second exterior end walls 34 and 36 and perpendicular to side walls 30 and 32. A plurality of arcuate connector segments 50 interconnect first and second planar segments 46 and 48 as well as couple the planar segments to the respective exterior side and end walls 30, 32, 34, and 36. Each of the arcuate connector segments 50 are integral with one or three other arcuate connector segments to define a plurality of roughly diamond shaped passages 52 or half diamond shaped passages 53, each with rounded corners as shown.

The planar segments 46 and 48, the exterior side and end walls, and the arcuate connector segments cooperate to define the octagonal cell cavities 40 for accommodating cells 18. As best illustrated in FIG. 3, cells 18a—18f are each disposed in a cavity 40 (FIG. 2) of body 12. The arcuate configuration of segments 50 is predetermined to securely retain the cells 18 within each cavity 40. More particularly, in the preferred embodiment, the overall size of each cavity as well as the shape of arcuate segments 50 are predetermined so that during the insertion of each cell 18 within each cavity 40, the arcuate segments 50 matingly engage the cell 18 along in excess of fifty percent (50%) of the exterior surface area 21 of film 20. The uniform thickness of the exterior case walls 30, 32, 34, and 36 and each partition wall 38 uniformly compresses the cell during insertion such as by compressing the glass fiber separators normally included therewithin. Accordingly, cells 18 are securely nested and retained within cavities 40. Finally, as illustrated in FIG. 5, top 14 and stops 62 longitudinally retain the cells within the cavities as shown.

As illustrated, the exterior end walls, exterior side walls, and partition walls of body 12 are integral with one thereby further increasing the robustness of body 12. It is preferred that the walls are formed of a thermally resistant plastic material such as polypropylene through processes known in the art such as stamping, casting, or injection molding.

In order to further define generally octagonal cell cavities 40, exterior side walls 30 and 32 are connected to exterior end walls 34 and 36 via truncated planar corner segments 54. As best illustrated in FIG. 2, the exterior walls 30, 32, 34, and 36 of body 12 are of a uniform length 56 defining an upper end 58 and a lower end 60. Top 14 is coupled to the case 12 proximate to upper end 58 and bottom 16 is coupled proximate to lower end 60 thereof (FIG. 1).

Figure 4:
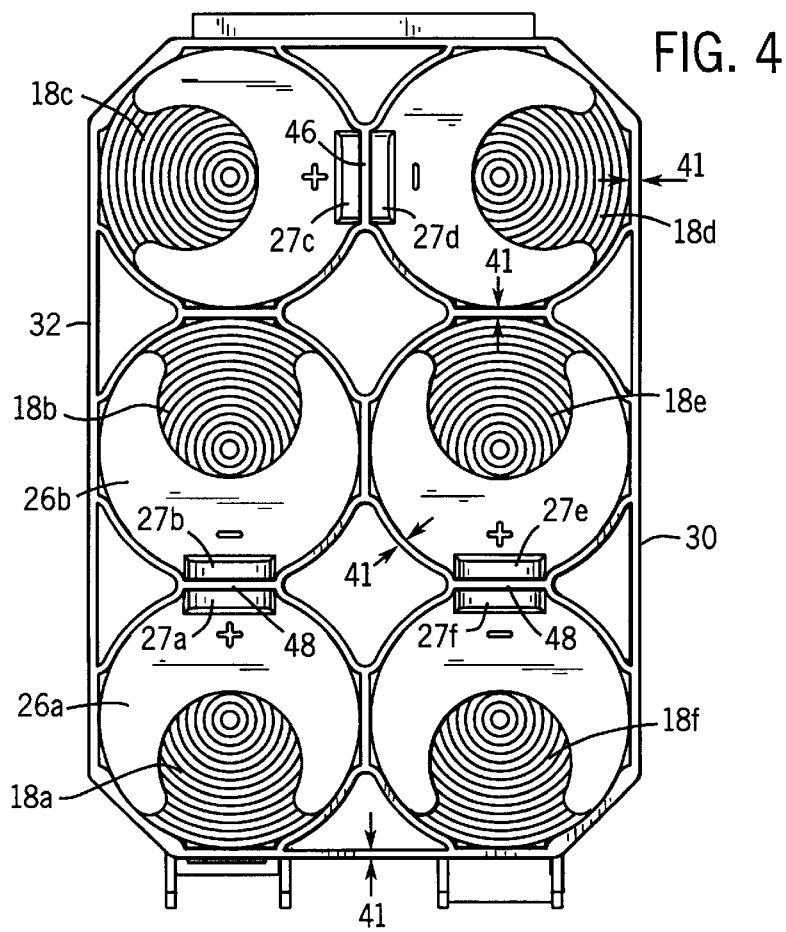
FIG. 4 is a top plan view of the battery shown in FIG. 1 with the top of the case and the battery cells removed for clarity.

In addition to the robustness, retention features, and moldability of the modified honeycomb configuration of the present invention, the flat surfaces provided by planar segments 46 and 48 facilitate the proper alignment of each cell within its respective cavity and provides a flat surface for complete electrical interconnection of the cells by welding as hereinafter described. More particularly, as best illustrated in FIGS. 3 and 4, the upstanding tabs 27a–27f of the cells 18a–18f are disposed within the cells 40 adjacent one of the planar surfaces 46 and 48. The welding interconnection between adjacent tabs within the battery case occurs through an orifice 71 formed in the planar segments 46 and 48 as hereinafter described and as illustrated in FIG. 5. Those skilled in the art will appreciate that a complete weld connection between adjacent tabs is facilitated by the planar configuration of surfaces 46 and 48.

As shown in FIGS. 3 and 5, body 12 further includes a plurality of semicircular stops 62 integral with and extending inwardly from arcuate connector segments 50 and truncated planar corner segments 54. Stops 62 are recessed from lower end 60 (FIG. 5) of these respective segments to properly position TMF cells 18 within cell cavities 40 thereby facilitating the electrical interconnection of TMF cells 18 as hereinafter described.

Figure 6:
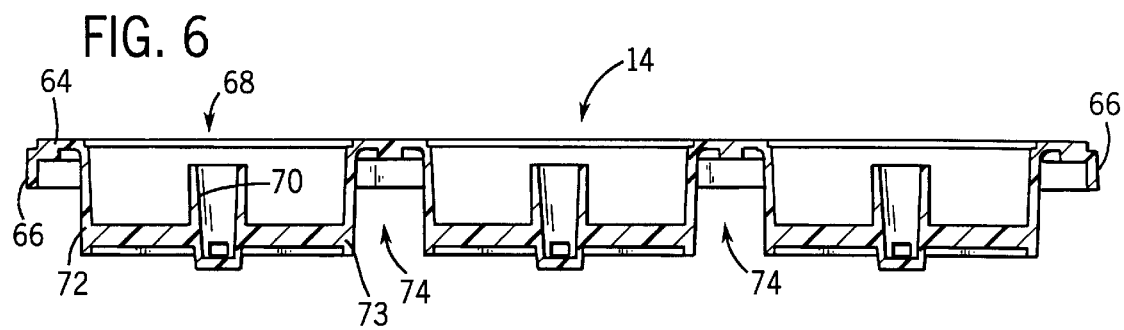
FIG. 6 is a cross-sectional view of the top of the battery case taken along the line 6—6 illustrated in FIG. 2.

The configuration of top 14 will now be described with reference to FIGS. 1, 5 and 6. Top 14 is preferably formed of the same plastic material as body 12 through stamping, casting, injection molding, or other method known in the art. Top 14 includes an upper planar member 64, a connecting flange 66 extending downwardly from the periphery of upper member 64, and a plurality of vents 68 (FIG. 6) disposable within cell cavities 40 when top 14 is connected to body 12 (FIG. 5). Vents 68 are configured in a manner generally known in the art and allow dissipation of gases generated within case 10 during the charging and discharging cycles of the TMF cells. Vents 68 also include venting passages 70 that selectively provide access to cell cavities 40 for placement of an electrolyte within each of the cell cavities.

Vents 68 are partially defined by a cylindrical connecting wall 72 interconnecting upper planar member 64 and a lower member 73. Cylindrical connecting walls 72 of 5 adjacent vents 68 are separated from one another to define a recessed cavity 74 that accommodates the upstanding tab 27 on conducting leads 26 of 28 for electrically interconnecting the TMF cells 18 as hereinafter described.

Figure 7:
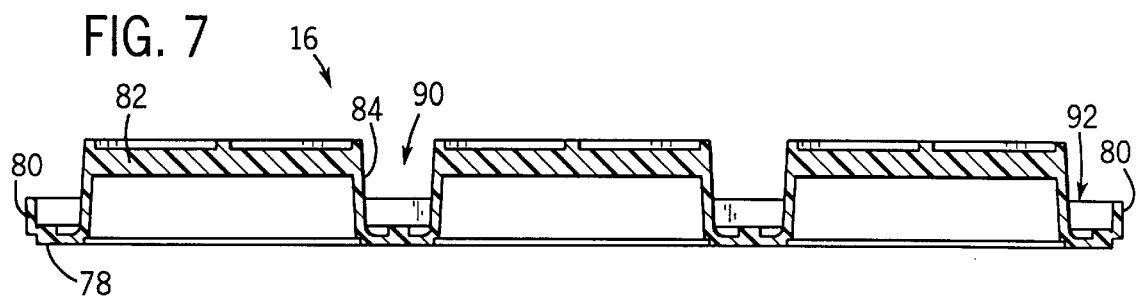
FIG. 7 is a cross-sectional view of the bottom of the battery case taken along the line 7—7 shown in FIG. 2.

As illustrated in FIG. 7, bottom 16 is configured in a manner substantially similar to top 14 and includes a lower planar member 78, a connecting flange 80, and upper members 82 recessed from lower planar member 78 and connected thereto via tapered cylindrical connecting walls 84. Bottom 16 does not include the vent arrangement formed in top 14.

Top and bottom 14 and 16, respectively, are connected to body 12 such as by heat sealing or other method known in the art. More particularly, connecting flanges 66 and 80 of top 14 and bottom 16, respectively, are configured to operatively engage exterior side and end walls 30, 32, 34, and 36 whereupon the top 14 and bottom 16 are heat sealed to body 12 to provide a sealed case that is vented through vents 68 in top 14.

The electrical interconnection of TMF cells 18 within the case 10 will now be described with reference to FIGS. 3 and 4. As illustrated, adjacent TMF cells are oppositely oriented in a manner generally known in the art for serial connection. Thus, cell 18a is electrically connected to exterior terminal 86 by second conducting lead 28a (FIG. 3) and is electrically connected to cell 18b via the connection of the respective first conducting leads 26a and 26b. The serial electrical connection of the remaining cells 18b–18f is accomplished in a substantially similar manner and is illustrated in the drawings.

As illustrated in FIG. 5, planar segment 46 separating cells 18c and 18d is provided with an orifice 71 for electrically connecting upstanding tabs 27c and 27d in a manner generally known in the art such as welding. Those skilled in the art will appreciate that the electrical interconnection of each of the plurality of cells 18a–18f occurring through second planar segments 48 are made in a manner substantially the same as that illustrated in FIG. 5 for connection to first planar segment 46. As shown in FIG. 3, the serial electrical connection of cells 18a–18f is completed by electrically connecting the second lead of cell 18f in a manner generally known in the art to terminal 88 which is coupled to the exterior of battery case 12 and, more particularly, to end wall 34.

As indicated above, the position of each TMF cell 18a–18f within its respective cavity 40 is dictated by the positioning of stops 62 as best illustrated in FIGS. 3 and 5. More particularly, each of the TMF cells are disposed within the respective cavity 40 until one of the first and second leads 26 and 28 connected thereto engage the stops 62 projecting inwardly into the cavity. The stops facilitate the proper positioning of the TMF cells relative to one another to allow precise electrical interconnection, as described above, with relative ease and simplicity.

When the TMF battery 8 is constructed in accordance with the present invention as described herein and illustrated in the appended drawings, the battery is contained within the structurally robust case 10 so as to securely retain the TMF cells therewithin. While the battery case 10 is illustrated and described herein as a six cell configuration, those skilled in the art will appreciate that the body 12, top 14, and bottom 16 of case 10 may be modified to provide a battery with virtually any number of TMF cells in order to meet capacity and space restrictions for a specific application. Moreover, while the electrical interconnection of the cells through connecting leads 26 and 28 is contemplated for the present invention, other techniques generally known in the art may be used without departing from the scope of the invention as defined by the appended claims.

What is claimed is:

1. A battery case comprising:
   a housing having a top and a bottom, said housing defining a plurality of cavities being generally octagonal in cross section.

2. The case of claim 1 wherein said housing includes first and second side walls, first and second end walls, and a plurality of partition walls defining said plurality of cavities.

3. The case of claim 2 wherein said first and second side walls, first and second end walls, and said plurality of partition walls each have the same thickness.

4. The case of claim 2 wherein said plurality of partition walls include planar walls and arcuate walls.

5. The case of claim 4 wherein each of said arcuate walls have a first end integral with one of said planar walls and a second end integral with one of said planar walls, said first and second end walls, or said first and second side walls.

6. The case of claim 2 further including a plurality of stops coupled to said housing, one of said plurality of stops extending into each of said plurality of cavities.

7. The battery case of claim 6 wherein each of said plurality of stops are formed integral with one of said first and second side walls, said first and second end walls, or said plurality of partition walls.

8. The battery case of claim 7 further including chamfered connecting walls interconnecting said first and second walls and said first and second end walls.

9. The battery case of claim 8 wherein said chamfered connecting walls partially define at least one of said plurality of cavities.

10. The battery case of claim 8 wherein said first and second side walls, said first and second end walls, said plurality of partition walls, and said chamfered connecting walls are integral with one another.

11. The battery case of claim 1 wherein said top includes a plurality of vents.

12. A battery comprising:
   a housing defining cavities that are generally octagon shaped in cross section;
   a terminal coupled to said housing;
   a top sealingly coupled to said housing;
   a bottom sealingly coupled to said housing; and
   battery cells disposed in said cavities, said battery cells being electrically interconnected in series with said terminal.

13. The battery of claim 12 wherein said housing includes side walls, end walls and partition walls, wherein said end, side, and partition walls define said cavities.

14. The battery of claim 13 wherein said end, side, and partition walls each have the same thickness.

15. The battery of claim 13 wherein said partition walls include planar walls and arcuate walls.

16. The battery of claim 15 wherein each of said arcuate walls have a first end integral with one of said planar walls and a second end integral with one of another of said planar walls, said end walls, or said side wall.

17. The battery of claim 12 wherein said battery cells each include a coiled thin metal film body defining a first end and a second end, and wherein said battery further includes a first conducting lead coupled to said first ends of said bodies and a second conducting lead coupled to said second end said bodies.

18. The battery of claim 17 wherein said first and second conducting leads are adjacent one of said planar walls, end walls, and side walls.

19. The battery of claim 12 further including a plurality of stops coupled to said housing, one of said plurality of stops extending into each of said cavities.

20. A battery case comprising:
   a body and a top and a bottom joined to the body,
   the body having exterior walls and interior partitions which together define a pattern of separate cavities extending between the top and the bottom, the partitions include alternating planar and arcuate sections.

21. The battery case of claim 20 wherein the partitions and exterior walls are integral with each other and of uniform thickness.

22. The battery case of claim 20 wherein the body includes terminal extensions projecting outwardly from an exterior wall.

23. A battery comprising:
   a case including a body and a top and bottom joined to the body, the body having exterior walls and interior partitions which together define a pattern of separate cavities extending between the top and bottom, the inner partitions including alternating planar and arcuate sections;
   a terminal extending from the case; and
   a battery cell disposed in each cavity, the cells being electrically connected to each other and to the terminal.

* * * * *